United States Patent Office 3,333,663
Patented Aug. 1, 1967

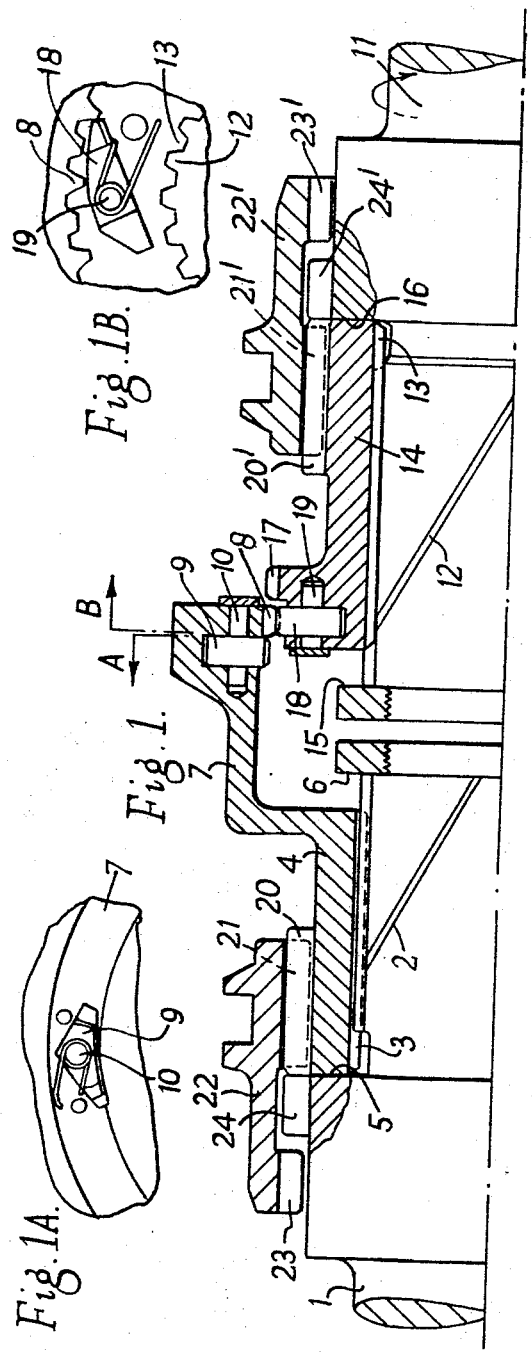

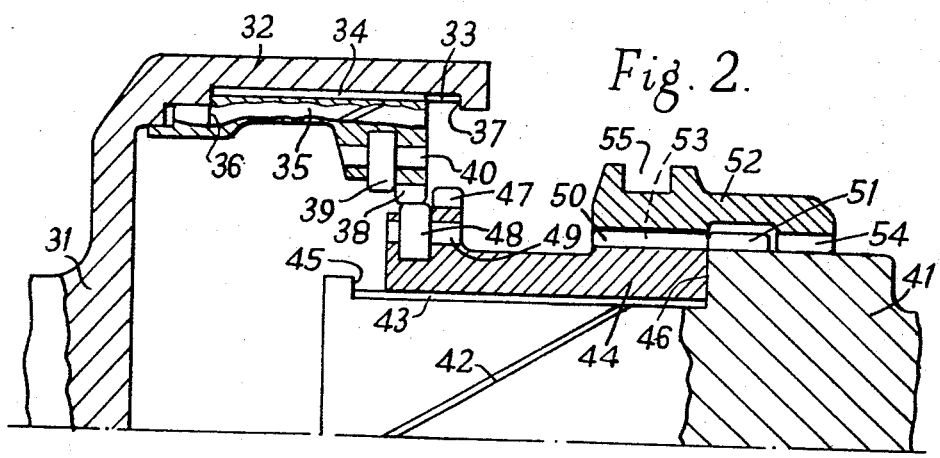
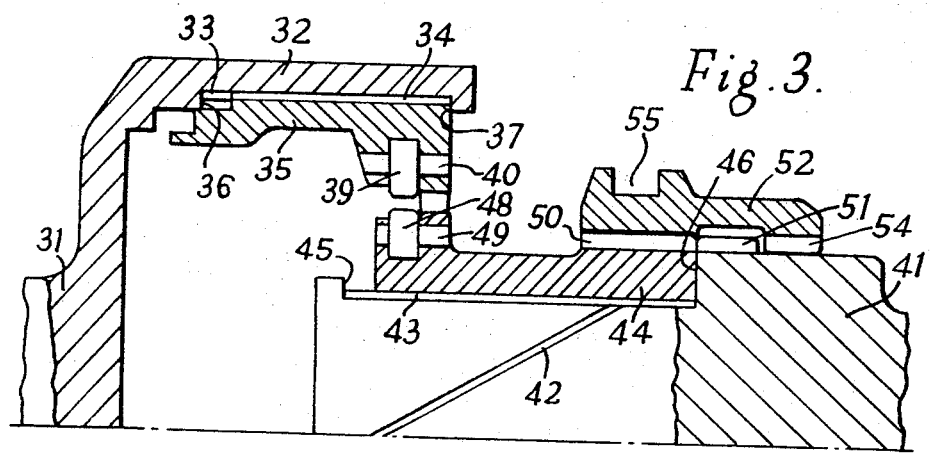

3,333,663
SYNCHRONOUS SELF-SHIFTING CLUTCHES
Herbert Arthur Clements, Weybridge, Surrey, and Harold Sinclair, Kensington, London, England, assignors to S.S.S. Patents Limited, London, England, a British company
Filed May 14, 1965, Ser. No. 455,821
Claims priority, application Great Britain, May 22, 1964, 21,320/64
6 Claims. (Cl. 192—67)

ABSTRACT OF THE DISCLOSURE

A synchronous self-shifting clutch having first and second rotary clutch parts and first and second intermediate members each having a set of clutch teeth, means constraining the respective intermediate members for helical movement between first and second positions relative to the corresponding rotary clutch parts, the fully engaged condition of the clutch corresponding to full interengagement of the sets of clutch teeth for the transmission of driving torque between the clutch parts, the sets of clutch teeth being interengageable and disengageable by relative axial movement of the intermediate members, and the clutch including means operative upon relative angular movement of the rotary clutch parts in one direction to effect at least initial interengagement of the sets of clutch teeth.

---

Figure 4:
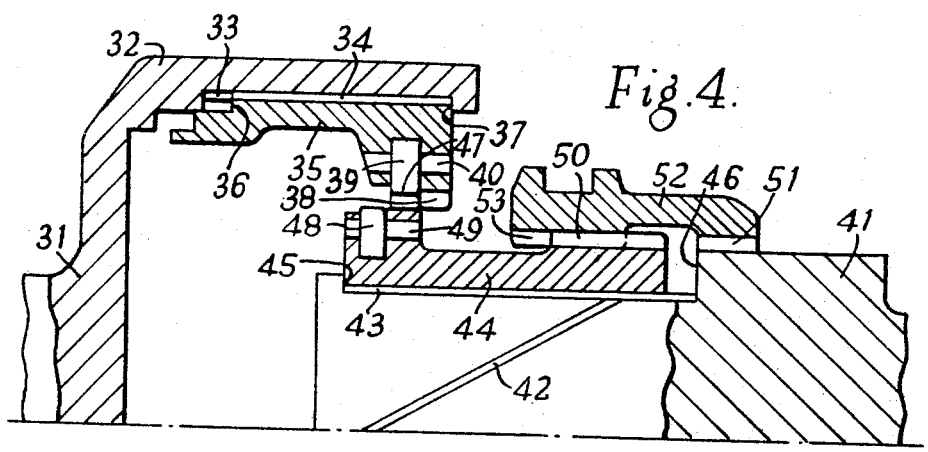

The present invention relates to synchronous self-shifting clutches. Such clutches are known comprising first and second substantially coaxial rotatable clutch parts, an intermediate member which carries clutch teeth engageable with clutch teeth associated with the first clutch part and which is constrained for limited helical movement relative to the second clutch part, to bring its clutch teeth into and out of engagement with the clutch teeth of the first clutch part, and wherein means, e.g., pawls are provided for initiating movement of the intermediate member from a disengaged position into the engaged position when relative rotation occurs between the first and second clutch parts in an appropriate direction.

Problems arise in the design and construction of clutches of this type designed for the transmission of high powers and/or for use at high rotational speeds, in particular when the relative acceleration between the first and second clutch parts is likely to be high. In low speed, high power clutches the intermediate member must be made correspondingly robust and hence massive in order to withstand the high loads. The consequent high inertia of this component and the frictional force between it and its supporting member impose corresponding loads on the pawls or other means for initiating toothed engagement of the intermediate member. In clutches designed for high speed and high power the relative acceleration between the first and second clutch parts tends to be high. It is however often not desirable to increase correspondingly the size of the components of the means for initiating engagement of the intermediate member, particularly when the said means comprise pawl and ratchet mechanism, which are preferably of light construction for smoothness of operation and suitability for oil damping of their ratcheting motion.

Another problem which arises in the construction of clutches of the type described, particularly in cases in which the relative acceleration between the first and second clutch parts is liable to be high, is presented by the fractional difference in angular velocities of the first and second parts as the intermediate member moves into the engaged position. This difference occurs since during the instant after the clutch has passed through synchronism the intermediate member has to move helically relative to the second clutch part in order to become fully engaged axially with the first clutch part. Therefore a sudden load is imposed on the clutch parts as they come into driving engagement, and in some cases it is desirable to provide oil dashpot damping means.

According to the invention a synchronous self-shifting clutch comprises first and second rotary clutch parts, a first intermediate member constrained for helical movement between first and second positions relative to said first clutch part, a second intermediate member constrained for helical movement between first and second positions relative to said second clutch part, clutch teeth on said first and second intermediate members for the transmission of torque between said first and second clutch parts when the clutch is engaged, said clutch teeth being engageable and disengageable by relative axial movement of said intermediate members, and means operative upon relative angular movement of said first and second clutch parts in one direction to effect interengagement of said clutch teeth.

Figure 5:
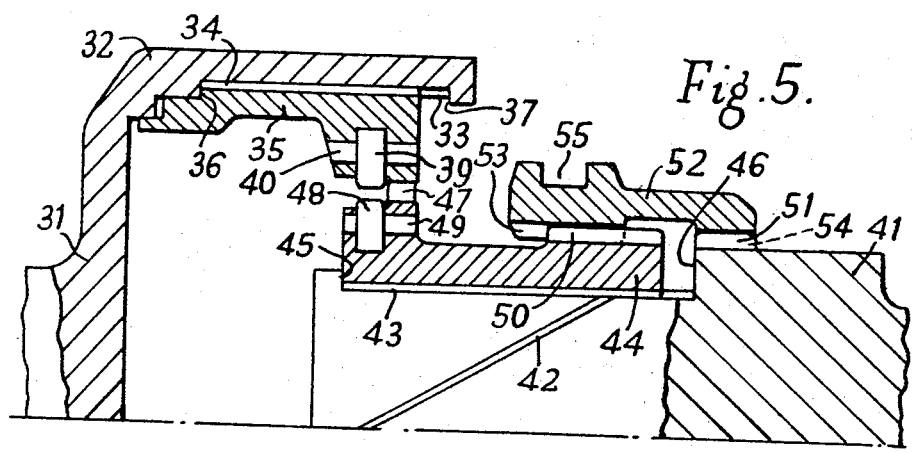
Figure 6:
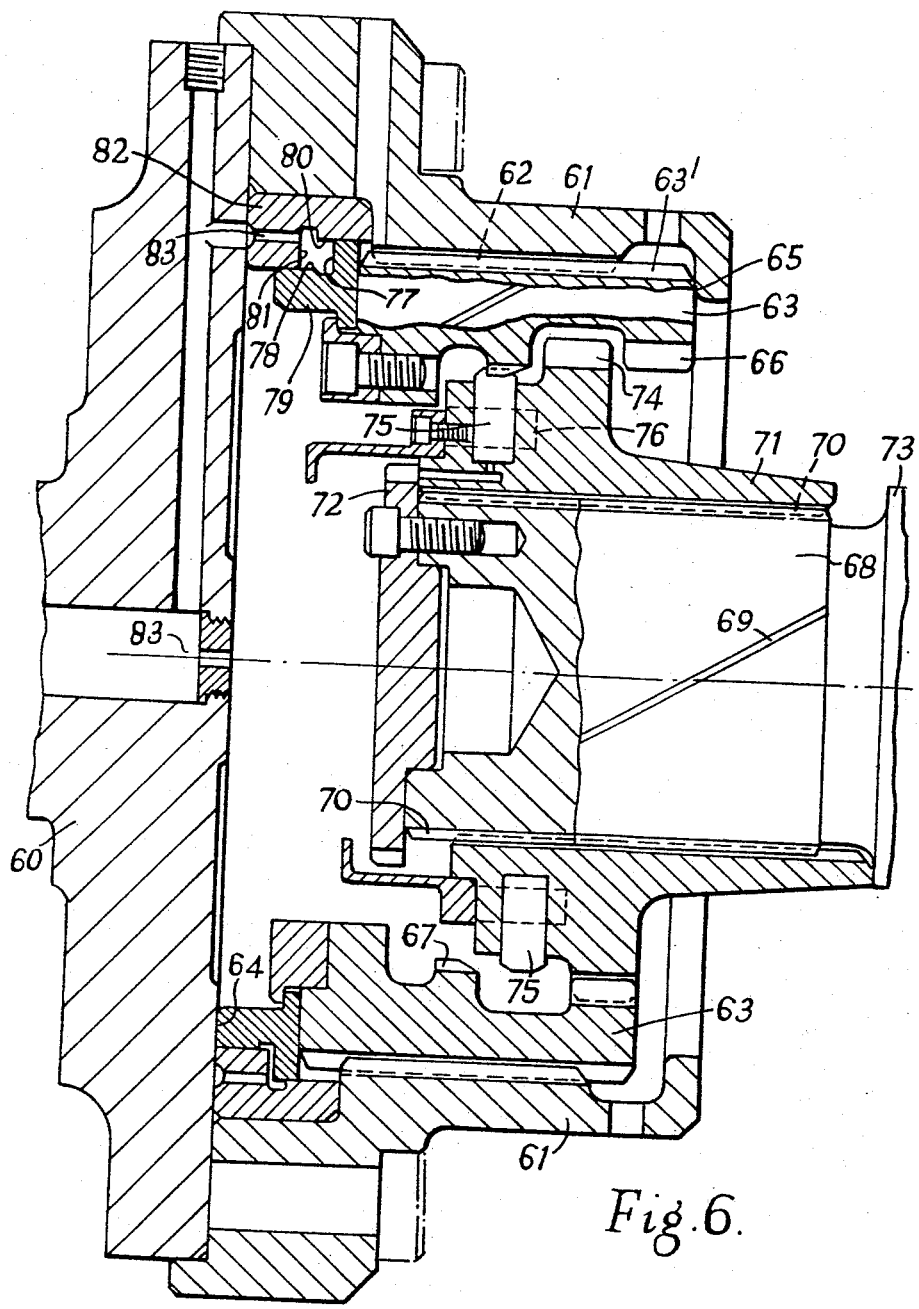

Some embodiments of the invention will now be described by way of example with reference to the accompanying drawings, in which FIG. 1 is a view in longitudinal section of an embodiment of the invention, FIG. 1A is a section on the line A of FIG. 1, FIG. 1B is a section on the line B of FIG. 1, FIGS. 2, 3, 4 and 5 are views in longitudinal section of another embodiment of the invention, showing the clutch in the disengaged condition, an intermediate condition, a second intermediate condition, and the engaged condition respectively, and FIG. 6 is a view in longitudinal section of another embodiment of the invention, with the clutch shown disengaged in the upper half and engaged in the lower half of the figure.

The clutch shown in FIGS. 1, 1A and 1B comprises a first rotary clutch part formed by a shaft 1 formed with external right-hand helical splines 2 with which engage internal splines 3 in an intermediate member 4 which can move helically relative to the shaft 1 by virtue of the splined connection, the movement being limited by axial stops 5 and 6 on the shaft 1. The intermediate member 4 has a cylindrical extension 7 formed with a ring of internal clutch teeth 8, and carrying pairs of diametrically opposite pawls 9 on pawl pins 10. The second rotary clutch part is a shaft 11 which is coaxial with the shaft 1 and is formed with external right-hand helical splines 12 in which engage internal helical splines 13 in an intermediate member 14 which is thus constrained for helical movement relative to the shaft 11, the movement being limited by axial stops 15 and 16. The intermediate member 14 carries a ring of external clutch teeth 17 and pairs of diametrically opposite pawls 18 on pawl pins 19.

In this embodiment of the invention both intermediate members 4 and 14 are provided with control sleeves. The intermediate member 4 is formed with straight external splines 20 with which are engaged internal splines 21 in a control sleeve 22 formed with a ring of internal dogs 23, and the shaft 1 is formed with a ring of external dogs 24. The intermediate member 14 is provided with similar control means 20′, 21′, 22′, 23′ and 24′.

Upon rotation of the shaft 11 in the direction of the arrow relative to the shaft 1 pawls 18 engage clutch teeth 8 and the first intermediate member 14, being of lower inertia than the second intermediate member 4, is drawn from its first position, as shown, to the left into its second position against the stop 15, engaging the clutch teeth 8 and 17, the interaction of which shifts the intermediate member 4 from its first position, as shown, to the right into its second position against the stop 6, so that the clutch teeth 8 move to the right beyond the clutch teeth 17, which now ratchet past the pawls 9. If a resilient actuating device associated with the control sleeve 22' is now actuated, the control sleeve 22' moves to the left and its dogs 23' engage with the shaft dogs 24' thereby locking the intermediate member 14 in its left hand position. Under these conditions the clutch is unidirectionally free; upon further reversal of the relative rotation of the shafts and 11 pawls 9 engage clutch tteeth 17, and teh intermediate member 4 is drawn to the left against the stop 5, bringing the clutch teeth 8 and 17 into engagement. The control sleeve 22 can now be moved to the right under the action of a resilient actuating device, so as to engage its dogs 23 with the shaft dogs 24 and thereby lock the intermediate member 4 against movement relative to the shaft 1. The clutch is now bidirectionally locked and can transmit driving torque in either direction of relative rotation of the shafts 1 and 11.

Referring to FIGS. 2, 3, 4 and 5 the first clutch part is a shaft 31 with a hollow cylindrical extension 32 at one end, the extension being formed with internal left-hand helical splines 33 with which engage external helical splines 34 on a first intermediate member 35 which is located within the extension 32 and which can move helically relative to the shaft 31 by virtue of the splined connection described, the movement being limited by axial stops 36 and 37 in the extension 32. The intermediate member 35 is formed with a ring of internal clutch teeth 38 and carries, at one side of the clutch teeth 38, pairs of diametrically opposite pawls 39 on pawl pins 40. The second clutch part is a shaft 41 which is coaxial with the shaft 31 and is formed with external left-hand helical splines 42 in which engage internal helical splines 43 formed in a second intermediate member 44 which is thus constrained for helical movement relative to the shaft 41, the movement being limited by axial stops 45 and 46 on the shaft 41. The intermediate member 44 carries a ring of external clutch teeth 47, and pairs of diametrically opposite pawls 48 on pawl pins 49, and is formed with a ring of straight splines 50, and the shaft 41 has a ring of shaft dogs 51. Control means are provided for the intermediate member 44 only, in the form of a control sleeve 52 formed with internal splines 53 engaged with the straight splines 50 of the intermediate member 44, and with a ring of internal dogs 54 which under circumstances to be described can upon axial shifting of the control sleeves 52 be engaged with the shaft dogs 51.

As seen from the left hand end of the clutch the noses of the pawls 39 and 48 point in anti-clockwise direction.

The operation is as follows:

With the locking dogs 54 of the control sleeve 52 disengaged, as shown in FIGS. 2 and 3, from the shaft dogs 51, the clutch is bidirectional free. Assuming that the shaft 41 is rotating in clockwise direction relative to the shaft 31 as viewed from the left hand end of the clutch, the intermediate member 35 is in its extreme left hand position and the intermediate member 44 is in its extreme right hand position (FIG. 2) in which its pawls 48 ratchet relative to the clutch teeth 38. With the intermediate member 44 in this position the control sleeve 52 cannot be shifted to lock the intermediate member 44, its internal dogs being baulked by the shaft dogs 51.

A resilient actuating device (not shown) engaging a groove 55 in the control sleeve 52 is operated so as to urge the control sleeve to the left so that its internal dogs 54 bear against the ends of the shaft dogs 51.

The relative rotation of the shafts 31 and 41 is then reversed, whereupon pawls 48 engage clutch teeth 38, and the intermediate member 35, being of lower inertia than the intermediate member 44 to which are connected the control sleeve 52 and actuating means therefor, is moved to the right against the axial stop 37, bringing its clutch teeth 38 into engagement with the clutch teeth 47 (FIG. 3). The interaction of the clutch teeth 38 and 47 then shifts the intermediate member 44 to the left against the axial stop 45, the helical movement of the intermediate member 44 bringing the dogs 54 of the control sleeve 52 into angular position relative to the shaft dogs 51 such that they can interengage and thereby lock the intermediate member 44 in its left hand position (FIG. 4). In this position of the intermediate member 44 the clutch teeth 47 ratchet relative to the pawls 39 and no driving torque is transmitted through the clutch. When the relative rotation of the shafts 31 and 41 is again reversed, clutch teeth 47 engage pawls 39 and the intermediate member 35 is thereby shifted to the left back to its original position in which it is against the axial stop 36 and the clutch teeth are engaged so that driving torque is transmitted through the clutch (FIG. 5).

At its left hand end the extension 32 is of stepped configuration internally, and the left hand end of the intermediate member 35 is of stepped external configuration, so that when the intermediate member 35 moves from its left hand position to its right hand position an open annular cavity is provided. Oil which is fed centrifugally into this cavity is trapped therein when the intermediate member 35 moves to the left into the clutch engaged position, the cavity closing to form a dashpot which cushions the movement of the intermediate member 35 into the clutch engaged position.

Referring to FIG. 6, the first clutch part is a shaft 60 to which is bolted a cylindrical member 61 formed with internal left-hand helical splines 62 with which engage external splines 63' on an intermediate member 63, the helical movement of the second intermediate member 63 relative to the shaft 60 being limited by stops 64 and 65. The intermediate member 63 is formed with a ring of internal clutch teeth 66 and a ring of internal ratchet teeth 67. The second clutch part is a shaft 68 formed with external left-hand splines 69 with which engage internal helical splines 70 in an intermediate member 71, which due to the splined connection is movable helically relative to the shaft 68, the movement being limited by stops 72 and 73 on the shaft 68. The intermediate member 71 is formed with a ring of external clutch teeth 74, and carries pairs of diametrically opposite pawls 75 on pawl pins 76. Seen from the left hand end of the clutch as viewed in FIG. 5 the noses of the pawls 75 point in clockwise direction.

When, as viewed from the left hand end of the clutch, the shaft 68 is rotating in anti-clockwise direction relative to the shaft 60, the pawls 75 ratchet past the ratchet teeth 67, the intermediate members 63 and 71 being against the stops 65 and 72 respectively. Upon reversal of the direction of relative rotation of the shafts 60 and 68, pawls 75 engage ratchet teeth 67 and the light weight first intermediate member 71 is shifted helically to the right relative to shaft 68 up to the stop 73, bringing its clutch teeth 74 into partial engagement, viz., about half way axially, with the clutch teeth 66. The interaction of the clutch teeth 74 and 66 then causes the heavier intermediate member 63 to shift helically relative to shaft 60 up to the stop 64, bringing its clutch teeth 66 into full engagement with the clutch teeth 74, as shown in the lower half of FIG. 6. The surfaces 77 and 78 of a ring 79 carried by the intermediate member 63, and the surfaces 80 and 81 of a ring 82 carried by the member 61 cooperate to form a dashpot chamber, which is fed with oil via ducts 83 and which cushions the movement of the intermediate member 63 to the position corresponding to full clutch engagement.

The clutch is now engaged, being capable of transmitting torque unidirectionally. Upon further reversal of the relative rotation of the shafts 60 and 68 the light weight intermediate member 71 moves to the left, and when it is against the stop 72 the heavier intermediate member 63 moves to the right up to the stop 65, disengaging the clutch.

We claim:
1. A synchronous self-shifting clutch comprising first and second rotary clutch parts, a first intermediate member, means constraining said first intermediate member for helical movement between first and second positions relative to said first rotary clutch part, a second intermediate member, means constraining said second intermediate member for helical movement between first and second positions relative to said second rotary clutch part, a first set of clutch teeth on said first intermediate member, a second set of clutch teeth on said second intermediate member, the fully engaged condition of the clutch corresponding to full interengagement of said sets of clutch teeth for the transmission of driving torque between said first and second clutch parts, said sets of clutch teeth being interengageable and disengageable by relative axial movement of said first and second intermediate members, and the clutch including means operative upon relative angular movement of said first and second rotary clutch parts in one direction to effect at least initial interengagement of said sets of clutch teeth.

2. A synchronous self-shifting clutch according to claim 1 wherein the said first position of said intermediate members correspond to full disengagement of said sets of clutch teeth, and the travel of said second intermediate member from its said first position to its said second position, with said first intermediate member remaining in its said first position, is such as to effect full interengagement of said sets of clutch teeth, and the travel of said first intermediate member from its said first position to its said second position, with said second intermediate member remaining in its said second position, is such as to shift said first set of clutch teeth out of interengagement with said second set of clutch teeth, the clutch including means operable to lock said second intermediate member in its said second position, and including also means responsive to relative angular movement of said rotary clutch parts in the other direction, with said locking means operative, to shift said first intermediate member to bring said first set of clutch teeth back into interengagement with said second set of clutch teeth.

3. A synchronous self-shifting clutch according to claim 1 wherein the said first positions of said first and second intermediate members correspond to full disengagement of said sets of clutch teeth, and the travel of said first intermediate member from its said first position to its said second position, with said second intermediate member remaining in its said first position, is such as to effect full interengagement of said sets of clutch teeth, and the travel of said second intermediate member from its said first position to its said second position, with said first intermediate member remaining in its said second position, is such as to shift said second set of clutch teeth out of interengagement with said first set of clutch teeth, the clutch including means operable to lock said second intermediate member in its said second position, and including also means responsive to relative angular movement of said rotary clutch parts in the other direction, with said locking means operative, to shift said first intermediate member to bring the said first set of clutch teeth back into interengagement with said second set of clutch teeth.

4. A synchronous self-shifting clutch according to claim 1 wherein said first positions of said intermediate members correspond to full disengagement of said sets of clutch teeth, and the travel of said first intermediate member from its said first position to its said second position, with said second intermediate member remaining in its said first position, is such as to effect partial interengagement of said sets of clutch teeth, and the travel of said second intermediate member from its said first position to its said second position, with said first intermediate member remaining in its said second position, is such as to effect full interengagement of said sets of clutch teeth.

5. A synchronous self-shifting clutch according to claim 1 including dashpot mechanism effective to damp the movement of one of said intermediate members in at least one direction between its said first position and its said second position.

6. A synchronous self-shifting clutch comprising first and second rotary clutch parts, a first intermediate member, means constraining said first intermediate member for helical movement between first and second positions relative to said first rotary clutch part, a second intermediate member, means constraining said second intermediate member for helical movement between first and second positions relative to said second rotary clutch part, a first set of clutch teeth on said first intermediate member, a second set of clutch teeth on said second intermediate member, the fully engaged condition of the clutch corresponding to full interengagement of said first and second sets of clutch teeth for the transmission of driving torque between said first and second rotary clutch parts, said first and second sets of clutch teeth being interengageable and disengageable by relative axial movement of said first and second intermediate members, and the clutch including means operative upon relative angular movement of said first and second rotary clutch parts in one direction to effect at least initial interengagement of said first and second sets of clutch teeth, and means operable to lock said first intermediate member in its said first position.

References Cited
UNITED STATES PATENTS

| | | | |
|---|---|---|---|
| 2,972,397 | 2/1961 | Sinclair | 192—67 |
| 3,106,276 | 10/1963 | Clements | 192—67 X |
| 3,154,181 | 10/1964 | Sigg | 192—67 |

BENJAMIN W. WYCHE, III, *Primary Examiner.*